United States Patent
Kushner et al.

(10) Patent No.: US 6,736,485 B2
(45) Date of Patent: May 18, 2004

(54) METHOD FOR INK JET PRINTING A DIGITAL IMAGE ON A TEXTILE, THE SYSTEM AND APPARATUS FOR PRACTICING THE METHOD, AND PRODUCTS PRODUCED BY THE SYSTEM AND APPARATUS USING THE METHOD

(75) Inventors: David S. Kushner, Great Neck, NY (US); Charles R. Hoffman, III, New York, NY (US)

(73) Assignee: SuperSample, New York, NY (US)

(*) Notice: Subject to any disclaimer, the term of this patent is extended or adjusted under 35 U.S.C. 154(b) by 0 days.

(21) Appl. No.: 10/390,850

(22) Filed: Mar. 18, 2003

(65) Prior Publication Data

US 2003/0169324 A1 Sep. 11, 2003

Related U.S. Application Data

(62) Division of application No. 10/011,361, filed on Dec. 3, 2001.

(51) Int. Cl.[7] ............................. B41J 2/21; D06P 1/02
(52) U.S. Cl. ........................ 347/43; 347/101; 8/466; 106/31.44
(58) Field of Search .................... 347/43, 101; 8/445, 8/446, 661, 664, 676; 106/31.44, 31.49

(56) References Cited

U.S. PATENT DOCUMENTS 6,001,137 A * 12/1999 Alfekri et al. ............... 8/445
6,284,004 B1 * 9/2001 Burglin et al. .............. 8/466

* cited by examiner

Primary Examiner—Lamson D Nguyen
(74) Attorney, Agent, or Firm—Lackenbach Siegel LLP

(57) ABSTRACT

The present invention provides a method of printing a digital image on a textile including the steps of selecting 8 to 16 inks to form an ink set, calibrating the ink set to create an ink set profile, using the ink set profile to calculate hue and shade-based look-up tables directly correlating the inks with the color space coordinates of the pixels of the digital image. The present invention also is a system and an apparatus providing means for performing the calibration of the ink set and direct correlation of the color space coordinates. The printed fabric has a first plurality of dots having 8 to 16 differently colored inks per dot and a second plurality of dots having one color per dot. Significantly, the present invention produces printed textiles having a high detail, deep color, and broad shading, as well as a combination of dyes heretofore considered incompatible.

19 Claims, 6 Drawing Sheets

METHOD FOR INK JET PRINTING A DIGITAL IMAGE ON A TEXTILE, THE SYSTEM AND APPARATUS FOR PRACTICING THE METHOD, AND PRODUCTS PRODUCED BY THE SYSTEM AND APPARATUS USING THE METHOD

This application is a division of application Ser. No. 10/011,361 filed Dec. 3, 2001.

BACKGROUND OF THE INVENTION

1. Field of the Invention

This invention generally relates to methods of ink printing and, more particularly, to multicolor ink printing on textiles. This invention also relates to systems and apparatus for multicolor ink jet printing on textiles, as well as multicolor ink printed textiles, per se.

2. Description of the Prior Art

As defined herein, the term "color space" is a mathematical definition for colors. Well known color spaces include CIE lab, CIE xyz, CIE luv, CIE xyY, CIE uvY, Cyan-Magenta-Yellow-Black (CMYK), and Red-Green-Blue (RGB). For example, the RGB triplet divides each color into an amount of red, green, and blue, such as (50,40,220) for a blue dominant color.

The simple act of printing a color image on textiles is well-known. In fact, the history of dying cloth may go back as far as 2600 B.C.

Nonetheless, numerous technical difficulties remain in attempting to accurately print an image or design on a textile. For example, refraction and internal reflection caused by the chosen textile results in color interference, which is perceived as a muddy or blurry image. Moreover, each textile fabric has a different set of refraction and internal reflection characteristics, and different weights and weaves of the same fabric will have different sets of refraction and internal reflection characteristics. The high level of variation of refraction and internal reflection often necessitates custom preparation of color separations for each type of fabric in order to avoid color interference. Yet, custom preparation of color separations takes a great deal of time and effort on the part of the textile colorist. Of course, the technical difficulties of printing multicolor images on textiles increases as the image or design becomes more complex.

Overall changes in the printing and imaging industries compound the traditional problems, especially as digital technology becomes the norm rather than the exception. For example, digital images are routinely coded in RGB for display on a computer monitor. However, printers typically use CMYK and textile colorists traditionally use CIE lab. Thus, an image initially in RGB will be routinely converted into a different color space before being printed. However, data can easily be lost or corrupted in the conversion to a different color space. Software correction may be applied in an attempt to recover lost or corrupted data, but such software correction may actually increase the errors.

Many prior art methods for non-textile printing attempt to overcome the disadvantages inherent in multiple color space transformations, such as U.S. Pat. Nos. 5,450,217 to Eschbach et al. and 5,953,499 to Narendranath et al. These patents rely on artificial blending or filtering color space data to "enhance" or "improve" the subsequently rendered image. Yet, clearly, such forced techniques are not ideal.

Printed images on textiles can be blurry because the colors bleed into or blend with one another. Color correction is often accomplished using gray replacement with undercolor addition or using undercolor removal. However, as stated above, it is preferable to achieve appropriate color separation without resorting to color correction. Bleeding and blurriness may also be reduced by manipulating the size of the individual ink dots deposited on the textile. U.S. Pat. Nos. 6,051,036 to Kusaki et al. and 6,142,619 to Miura et al. disclose recent attempts to increase printing accuracy by adjusting the size of the ink dots deposited on the textile. Yet, while overall sharpness may be enhanced, subtle blending and shading risk being attenuated, which would detrimentally affect the fidelity of the printed image or design.

Improvements in hardware and software make it possible to use more than three dyes to make a color. Current systems and method usually do not utilize current technology to its full potential. Currently, gray scales are usually made with a dithered black, a dithered gray, or a combination of both dithered black and gray. Yet, dithered blacks and grays generally do not reproduce deep and true blacks and grays. It has been found that, using multiple overlapping sets of complementary colors, a composite shading scale can be built that provides a robust shading scale without visible dithering patterns and also allows for subtle casts to color renderings.

The aforementioned Kusaki et al. and the Miura et al. patents disclose ink jet printing using a maximum of eight colors. The ink jet printing art is generally directed to printing with sets of 4 to 8 differently colored inks. This direction of the art is further discussed in U.S. Pat. No. 5,833,743 to Elwakil.

It is also a long accepted practice, as underscored in the Kusaki et al. patent that different types of dyes (e.g., acid and fiber-reactive) may not be intermixed for printing on fabrics other than silk. In other words, fiber-reactive dyes are used on cotton, silk, and wool, while acid dyes are used on nylon and silk.

There is a need in the art for a system that provides both a broad range of shading and vivid, bright, and true colors, wherein complex digital images can be faithfully printed on a range of fabrics.

SUMMARY OF THE INVENTION

In light of the foregoing, it is an object of the present invention to provide a method for printing an image on a textile directly from a digital image with specific user-defined inks.

It is also an object of the present invention to provide such a method for printing an image on a textile, wherein the user selects 8 to 16 inks to create a user-defined high-multiplicity ink set. The user-defined ink-set is linearized with user-defined calibration curves.

It is a further object of the present invention to provide such a method for printing an image on a textile, wherein the pixels of the digital image are directly correlated with the ink set using hue and shade values, without transformation into conventional color spaces, such as CIE lab, CIE xyz, CIE luv, CIE xyY, CIE uvY, or CMYK.

In addition, it is an object of the present invention to provide a system for selecting inks for printing on a textile, in which a user-defined ink set profile is used to correlate an amount of inks with hue and shade values derived directly from the pixels of a digital image defined in the RGB color space.

Moreover, it is an object of the present invention to provide an apparatus for textile printing having a plurality of inks calibrated as a user-defined ink profile that prints an amount of selected inks on a fabric based on hue and shade values from the pixels of a digital image.

Furthermore, it is an object of the present invention to provide a printed textile having a high dpi (dots per inch) count, and a broad range of color density and shading.

It is a further object of the present invention to provide a printed textile with different types of dyes (e.g., acid and fiber-reactive), and yet achieve faithful reproduction of complex pictorials and images.

These and other objects of the present invention are preferably achieved by a method of reproducing a digital image on a textile including the steps of the user selecting 8 to 16 inks to form an ink set, calibrating the ink set to create an ink set profile, using the ink set profile to calculate hue-based and/or shade-based look-up tables (LUTs) that directly correlate the inks with the color space coordinates (e.g., RGB values) of the pixels of the digital image. By directly correlating the inks and the color space coordinates using hue and shade, the present method faithfully reproduces the digital image on the textile. The method may be practiced using a system and/or apparatus that provides means for performing the calibration of the ink set and direct correlation of the color space coordinates. The printed fabric has a first plurality of dots having 8 to 16 differently colored inks per dot and a second plurality of dots having one color per dot. The 8 to 16 differently colored inks are user-defined and avoid certain conventional art directed ink jet ink-set colors, particularly including gray. Significantly, the method, system, and apparatus produce a printed textile having a high level of detail, depth of color, and broad range of shading. The printed textile also has a combination of dye types that heretofore were considered incompatible. One preferred embodiment has 12 inks, which includes or provides 7 true colors, 4 pseudo-colors (i.e., a mix of two or more true colors), and black, and wherein 8 colors are fiber-reactive inks and 4 colors are acid inks.

DESCRIPTION OF THE INVENTION

Figure 1:
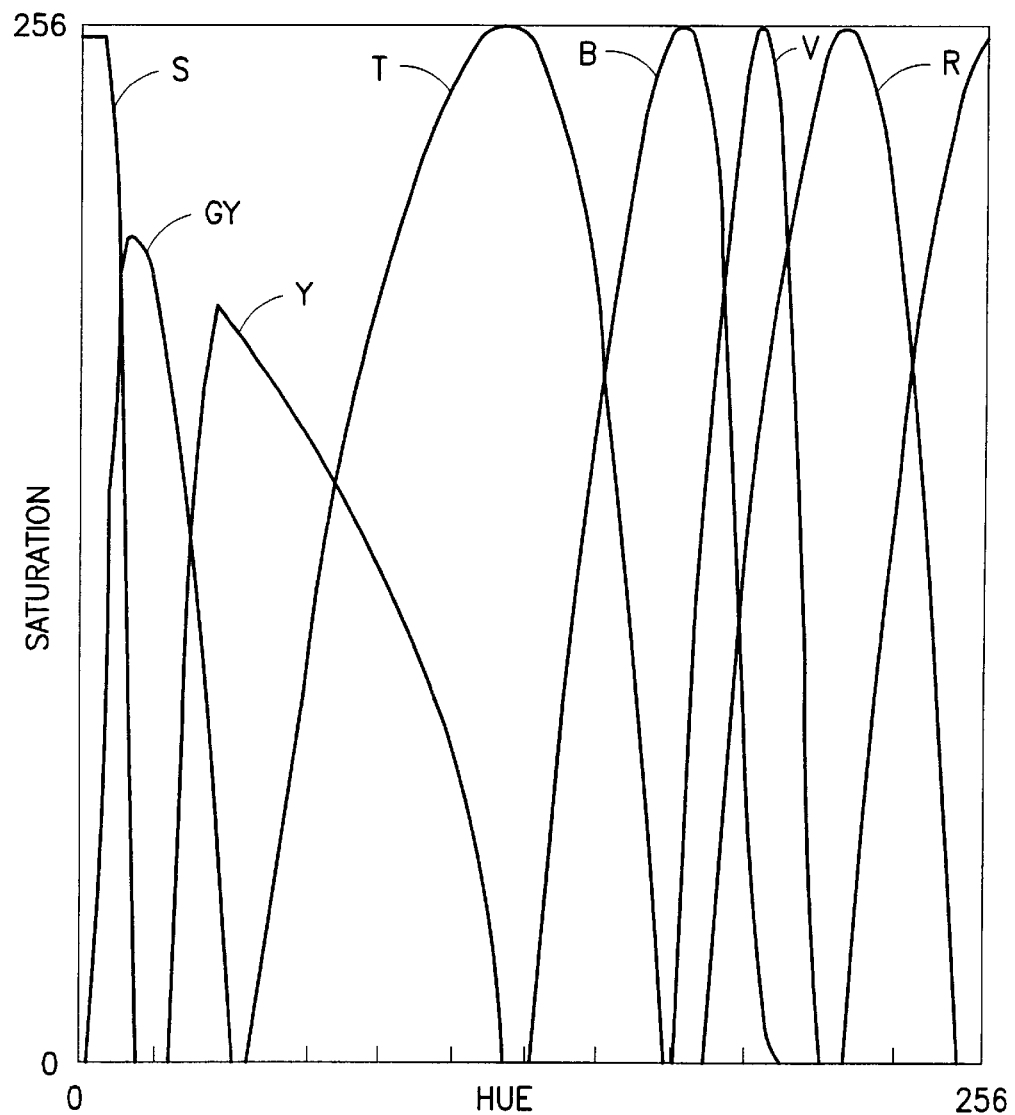
FIG. 1 is a graph of hue and saturation curves for 7 differently colored inks of a 12-ink ink-set according to the present invention, wherein S is scarlet, GY is golden yellow, Y is yellow, T is turquoise, B is blue, V is violet, and R is red.

The present invention provides a method for color printing on a textile. The method of the present invention includes the steps of: (1) providing a digital image having a plurality of pixels in the RGB color space; (2) selecting a plurality of inks correlated to the digital image to create a user-defined ink set; (3) creating an ink set profile from user-defined calibration (e.g., absorption) curves for the user-defined ink-set; (4) defining a chromatic value and a shade value for each of the plurality of pixels; (5) determining an amount of inks corresponding to the chromatic and shade values as a function of the ink set profile; and (6) printing the selected amount of inks as a pixel-corresponding ink jet dot portion on the textile. There is no transformation into or through CIE lab, CIE xyz, CIE luv, CIE xyY, CIE uvY, or CMYK.

The present invention is also a system for selecting an amount of inks to print on a textile. The system includes: (1) a multi-color digital image having a plurality of pixels, the plurality of pixels each having a respective set of color space coordinates; (2) a plurality of inks correlated to the multi-color digital image forming a user-defined ink set; (3) an ink set profile based on user-defined calibration (e.g., absorption) curves for the plurality of inks on a user-selected textile; (4) means for determining a chromatic value and a shade value for a selected pixel from its respective set of color space coordinates; (5) means for selecting an amount of inks from the ink set based on the chromatic value; and (6) means for selecting an amount of inks from the ink set based on the shade value.

In addition, the present invention provides an apparatus for printing on a textile. The apparatus includes: (1) a plurality of user-selected inks forming a user-defined ink set; (2) an ink set profile based on user-defined calibration (e.g., absorption) curves for the plurality of inks on a user-selected textile; (3) means for determining a chromatic value and a shade value for a pixel having a set of color space coordinates by correlating the color space coordinates to the ink set profile; (4) means for selecting a first amount of inks from the ink set based on the chromatic value; (5) means for selecting a second amount of inks from the ink set based on the shade value; and (6) means for printing the first and second amounts of inks on a textile.

A preliminary step in the method, apparatus, and system of the present invention is selecting a digital image for printing. The method, apparatus, and system of the present invention is intended to reproduce elaborate digital images with both true, vivid colors and a broad range of complex shading. However, the method, apparatus, and system can reproduce any digital image. Preferably, the method, apparatus, and system of the present invention uses 8-bit or 24-bit digital images defined in the RGB colorspace. It is noted that no color intensity is determined for 8-bit (indexed color or 256 color) images.

The method, apparatus, and system of the present invention may be used to print digital images on any type of fabric. Woven, knitted, and/or non-woven fabrics may be used. The fibers in the fabrics may be natural and/or synthetic. Moreover, the method, apparatus, and system of the present invention are not limited by the thread count of a selected fabric. However, better results are commensurably obtained with higher thread counts. Preferred fabrics have a thread count of at least about 30 to about 300 or more. While not being limited to a specific hypothesis, it is believed that fabrics with higher thread counts will absorb significant amounts of dye such as where 8 to 16 individual drops are deposited corresponding to one pixel.

After selecting the digital image for printing and the fabric upon which the image will be reproduced, an ink-set is selected by the user. The method, apparatus, and system of the present invention contains 8 to 16 differently colored inks. Sixteen is believed to be both the optimal number and the practical maximum number of differently colored inks for use in an ink-set according to the present invention.

In one preferred aspect, the user-selected ink-set is selected based on the colors in the user-selected digital image to be printed. For example, if the selected digital image contains an abundance of a certain color, that color can be selected as an ink in the ink-set. As another example, if the selected digital image contains a certain color that is known to be difficult to accurately print, that color can be selected as an ink in the ink-set.

In another preferred aspect, the-ink-set is selected from one or more predetermined or pre-optimized ink-sets that were found to provide exceptional results for numerous divergently complex digital images. In particular, it has been surprisingly discovered that many divergent types of complex digital images can be accurately and faithfully printed using a preferred pre-optimized 12-ink ink-set containing: black, light magenta, blue, turquoise, medium turquoise, blue, red, medium red, scarlet, violet, golden yellow, and yellow. Significantly, the combination of scarlet, medium red, red, and violet produces an exceptionally wide range of colors that have heretofore been difficult to accurately and faithfully print on fabric. Furthermore, the foregoing optimized ink-set does not contain green, orange, or gray. It was surprisingly discovered that a full gray table can be produced using black and the eleven chromatic inks listed in the foregoing ink-set. It was also surprisingly found that 8 to 16 individual drops can be used to accurately and faithfully print an integrated dot portion corresponding to a single pixel of a complex image.

It was also surprisingly discovered that the method, apparatus, and system of the present invention can concurrently employ combinations of different types of dyes, such as acid, basic, fiber-reactive, and direct dyes, regardless of the selected textile. While current practice advises that silk is the only fabric that can be dyed with both reactive and acid dyes, the present invention concurrently uses both fiber-reactive and acid dyes on other types of fabrics with improved printed image fidelity.

The following table summarize a preferred 12-ink ink-set for use in the present invention. The acid dyes used in this preferred ink-set are manufactured by DTP-Link (DTP), 27-4 Dangjeong-dong, Gunpo-si, Geonggi-do, Korea and are currently sold under the color-names and vendor numbers listed in the following table. The fiber-reactive dyes in this preferred ink-set are manufactured by MacDermid Colorspan, Inc. (MCS), 6900 Shady Oak Road, Eden Prairie, Minn. and are currently sold under the color-names and vendor numbers listed in the following table.

TABLE 1

A Preferred Ink-set

| Color | Type | Vendor | Number |
|---|---|---|---|
| Black 501 | Acid | DTP | 0900758-001 |
| Light Magenta 568 | Acid | DTP | 0900758-009 |
| Blue 310 | Fiber Reactive | MCS | 0900642-003 |
| Turquoise 320 | Fiber Reactive | MCS | 0900642-004 |
| Medium Turquoise 325 | Fiber Reactive | MCS | 0900642-005 |
| Blue 526 | Acid | DTP | 0900758-005 |
| Red 340 | Fiber Reactive | MCS | 0900642-007 |
| Medium Red 345 | Fiber Reactive | MCS | 0900642-008 |
| Scarlet 370 | Fiber Reactive | MCS | 0900642-009 |
| Violet 513 | Acid | DTP | 0900758-003 |
| Golden Yellow 390 | Fiber Reactive | MCS | 0900642-0011 |
| Yellow 395 | Fiber Reactive | MCS | 0900642-0012 |

TABLE 2

Approximate RGB Values for Preferred Ink-Set of Table 1

| Color | R | G | B |
|---|---|---|---|
| Black 501 | 50 | 50 | 50 |
| Light Magenta 568 | 250 | 216 | 255 |
| Blue 310 | 0 | 0 | 150 |
| Turquoise 320 | 0 | 100 | 100 |
| Medium Turquoise 325 | 50 | 150 | 150 |
| Blue 526 | 134 | 162 | 199 |
| Red 340 | 150 | 0 | 100 |
| Medium Red 345 | 180 | 80 | 140 |
| Scarlet 370 | 150 | 0 | 0 |
| Violet 513 | 150 | 40 | 180 |
| Golden Yellow 390 | 180 | 90 | 0 |
| Yellow 395 | 140 | 140 | 0 |

One preferred 16-ink ink-set includes the 12 differently colored inks discussed above with the addition of Cibacron® Yellow P-6GS, Cibacron® Red P-B, Cibacron® Red P-6B (more blue component compared to Cibacron® Red P-B), and Cibacron® Navy P-2R-01. These additional four inks are fiber reactive inks currently sold under the aforementioned trademarks by Ciba Specialty Chemical Corp., 4050 Premier Drive, High Point, N.C. Another preferred 16-ink ink-set includes the 12 differently colored inks discussed above and 4 additional acid dyes: Morjet® Flavine 8G, Morjet® Navy, and Morjet® Red 2B, which are currently sold by Morlot Color and Chemical Co., 111 Ethel Avenue, Hawthorne, N.J., as well as Acid Light Blue 532 (0900758006) currently sold by DTP.

The ink-set calibrations (e.g., grayscale, hue, and saturation) described hereinafter are preferably automated and/or computer assisted. Nonetheless, the calibrations are usually selected, modified, or corrected before the final printing, since the human eye must be the ultimate arbiter of the quality and fidelity of the printed fabric image compared to the user-selected digital image.

User-selected calibration curves for use in the present invention include gamma, linear, bias, gain, ease, Kubelka-Monk, and combinations thereof. Significantly, ink profiles for use in the present invention are preferably calibrated using an ease equation or a modified Kubelka Munk equation.

Ease equations are used in animation to make motion acceleration look smooth. Surprisingly, it has been discovered by the present inventors that ease equations may be used to smoothly blend neighboring colors. An ease equation takes an initial curve and returns a smoothed curve that is flat on the top and bottom. For the present invention, the initial curve is the hue line and x is a value on the hue line. The smoothed curve is the calculated color density and y is a value on the calculated color density curve. First, $x_o$ is compared against a maximum value $Z_{max}$ and a minimum value $Z_{min}$. If $x_o$ is equal to or greater than $Z_{max}$ then y equals $Z_{max}$, and if $x_o$ is equal to or less than $Z_{min}$ then y equals $Z_{min}$. For portions of the initial curve in which $x_o$ is greater than $Z_{min}$ and less than $Z_{max}$, the initial curve is smoothed as a function of its slope.

The Kubelka Munk equation is commonly used for calibrating absorption curves. However, the present invention directly uses RGB values rather than the traditional x,y,z values. The prior art does not utilize such modifications of the Kubelka-Munk equation. The present invention solves for R as well as k/s.

Furthermore, each calibrated curve has an "in-portion" going from a initial value $y_i$ to a peak value $y_p$, and an "out-portion" going from peak value $y_p$ to a final value $y_f$, which may be equal to or different from the initial value $y_i$. Thus, each complete calibrated curve is a combination of two partial curves. The partial curves may have the same or different functions. For example, a complete calibrated hue and saturation curve may have an in-portion that is a function of an ease equation, and an out-portion that is a function of the modified Kulbelka-Monk equation discussed above. Moreover, the partial curves may have the same or different parameters that define the actual shape of the partial curves. For example, a complete calibrated hue and saturation curve may have an in-portion that has an overall parabolic shape, and an out-portion that has an overall logarithmic shape.

In light of the foregoing and once the ink-set is chosen, the grayscale of each ink in the ink-set should be calibrated or linearized from 0% ink saturation (the ground color) to full or 100% saturation. Calibration is often necessary because ink printed on fabric has a tendency to proceed very quickly from a perceived 0% saturation to a perceived 100% saturation. In fact, when a grayscale band is printed without calibration, 90% or more of that grayscale band is usually perceived as being 100% saturated. However, for accurate printing, a grayscale band must proceed smoothly from a perceived 0% saturation to a perceived 100% saturation, where only about 1% of that grayscale band is 100% saturated.

Calibration of the grayscales is preferably done by printing a band of each dye on a fabric (usually the user-selected fabric as discussed above) beginning at 0% ink saturation and ending at 100% ink saturation, optically scanning the resulting bands to measure the absorption characteristics of each dye on the user-selected fabric, and determining calibrated (i.e., smooth) grayscales as a function of the measured absorption characteristics. The equation used to determine calibrated grayscales from measured absorption characteristics can be gamma, linear, bias, Kubelka-Monk, or combinations thereof, as discussed above.

Pursuant to the present invention, look-up tables (LUTs) are created for hue and saturation, grayscale, and optionally one or more pseudo-colors. The LUTs directly transform the RGB triplet of a pixel into hue and shade values, without employing transformations through the traditional CIE lab, CIE xyz, CIE luv, CIE xyY, CIE uvY, and CMYK color spaces. It is believed that this direct transformation from the RGB color space to a hue-based color space minimizes possible errors and/or miscalculation of the original RGB values. Thus, the present method, apparatus, and system achieves high fidelity of the printed fabric compared to the original user-selected digital image.

The hue value of a given RGB triplet is preferably determined using linear interpolation between the two largest values of the RGB triplet for the pixel. The saturation value is preferably determined using the maximum value of the RGB triplet. The gray component is preferably determined by the minimum value of RGB triplet.

A first LUT takes the RGB triplet of a pixel and determines its hue value and its color value or saturation. An optional pseudo-color LUT may be used to determine the hue value and saturation of the pixel based on a pseudo-color blend of different strengths of the same dye (e.g., red and medium red, or turquoise and medium turquoise). A second LUT takes the RGB triplet of the same pixel and determines the gray scale value thereof. An third LUT linearizes the results for the first and second LUTs based on the light absorption characteristics of a specific fabric.

Once the hue, saturation, and gray values of the pixel have been determined, these values are used to select the inks in the ink-set that are used for the final printing. The chromatic component (hue and saturation) is preferably constructed using hue-line neighboring inks (e.g., blue and turquoise). The gray component is preferably constructed using hue-line complementary colored inks to make a smooth achromatic shading scale.

For speed and consistency, the steps of calibration, LUT creation, and RGB to hue-based color space transformation are preferably performed by a computer program, as known by one skilled in the art. The computer program allows a user to specify the ink-set and the calibration or profiles of each ink in the specified ink-set. The program employed in the Example is the L12 program, Supersample Corporation, 119 West 23$^{rd}$ Street, New York, N.Y., 10011. The apparatus of the present invention preferably includes the L12 software, a printer driver, and a commercial ink-jet printer. The computer program cooperates with a raster image processor (RIP) or printer driver that selects the inks from the ink-set for the final printing, as known by one skilled in the art. A preferred RIP for use in the present invention is sold by Dr. Wirth Software, GmbH, Frankfurt, Germany, through its United States subsidiary DP Innovations, Inc., Spartanburg, S.C., under the trademark Proofmaster.

The printer driver controls an ink jet printer that prints the user-selected inks onto the user-selected fabric. An ink jet printer for use in the present invention will have 8 to 16 slots for receiving at least 8 to 16 differently colored inks. Unlike the prior art, in which 12 slots were provided, but used only up to 8 differently colored inks, the present invention provides that each of the 12 slots will have a differently colored ink therein. Several types of ink jet printers are useful for the present invention including: (1) thermal jet printers, which deliver an ink through an ink nozzle to a substrate by pressure created from boiling or "bubbling" the ink, (2) pulse jet printers, which deliver an ink through an ink nozzle to a substrate by vacuum pressure created from applying an electric current to a piezoelectric element within the ink nozzle, and (3) electric charge control printers, which particulate an ink by vibrating an ink nozzle using an ultrasonic wave and direct the ink particle using a electric field. Ink jet printers for use in the present invention include thermal ink jet printers sold by MacDermid Colorspan Corporation, Eden Prairie, Minn., under the trademarks Displaymaker Series XII and Displaymaker Fabrijet XII.

After the fabric is dyed, numerous post-processing steps may be followed. For example, since most inks printed on fabric need to be fixed, the process of the present invention may include a fixation step. The fixation step may include any known method for fixing ink, such as steam fixing, heat fixing, cold fixing, and chemical fixing (e.g., acid or alkali). Steam fixing is preferred. In addition, unreacted dyes and pretreatment substances may be removed from the printed fabric by washing the printed fabric in water or water with detergent.

The method, system, and apparatus of the present invention produce an ink jet printed fabric. The fabric preferably has 30 to 300 threads per inch or more. The ink jet printed image on the fabric includes a plurality of integrated ink jet drop portions deposited on the fabric. Each integrated ink jet drop portion is combined from or formed of 1 to 16 individual ink jet drops selected from 8 to 16 differently colored inks. In addition, the ink jet printed image includes a plurality of pixel-correlated integrated ink jet drop portions wherein each drop portion has 8 to 16 individual ink jet drops selected from the 8 to 16 differently colored inks.

Printed fabric produced according to the present invention can be used to produce numerous printed fabric articles, such as sheets, pillows, quilts, wall hangings, neckties, scarves, shirts, and blouses.

EXAMPLE

Barney's KALEIDOSCOPIC Women's Silk Scarf

The following LUTs were used with the pre-optimized ink-set (Table 1, above) for printing a complex image on silk, namely a women's silk scarf sold by Barney's New York clothing stores under the trademark KALEIDOSCOPIC. There are seven color curves in the pure-color hue and saturation LUT—scarlet, golden yellow, yellow, turquoise, blue, violet, and red. There are four color curves in the pseudo-color hue and saturation LUT—medium red, medium turquoise, light blue, and light magenta. There are nine color curves in the gray scale LUT—black, cyan, golden yellow, medium red, light magenta, scarlet, light blue, yellow, and blue. All twelve of the differently colored inks in the preferred pre-optimized ink-set are present in the absorption profiles LUT.

As used in the following LUTs, K is black, LM is light magenta, B is blue, T is turquoise, MT is medium turquoise, LB is light blue, R is red, MR is medium red, S is scarlet, V is violet, GY is golden yellow, and Y is yellow.

TABLE 3

Pure-Color Hue and Saturation Curves (FIG. 1)

| | Curve # | | | | | | |
|---|---|---|---|---|---|---|---|
| | 1 | 2 | 3 | 4 | 5 | 6 | 7 |
| Slot Color | S | GY | Y | T | B | V | R |
| Slot | 9 | 11 | 12 | 4 | 3 | 10 | 7 |
| Channel | 9 | 11 | 12 | 4 | 3 | 10 | 7 |
| Hue In | 220 | 2 | 25 | 48 | 131 | 172 | 181 |
| Hue Middle | 258 | 11 | 36 | 120 | 171 | 192 | 216 |
| Hue Out | 272 | 43 | 121 | 169 | 202 | 213 | 252 |
| Saturation In | 0 | 0 | 0 | 0 | 0 | 0 | 0 |
| Saturation Peak | 256 | 203 | 186 | 256 | 256 | 256 | 256 |
| Saturation Out | 0 | 0 | 0 | 0 | 0 | 0 | 0 |

TABLE 4

Figure 2:
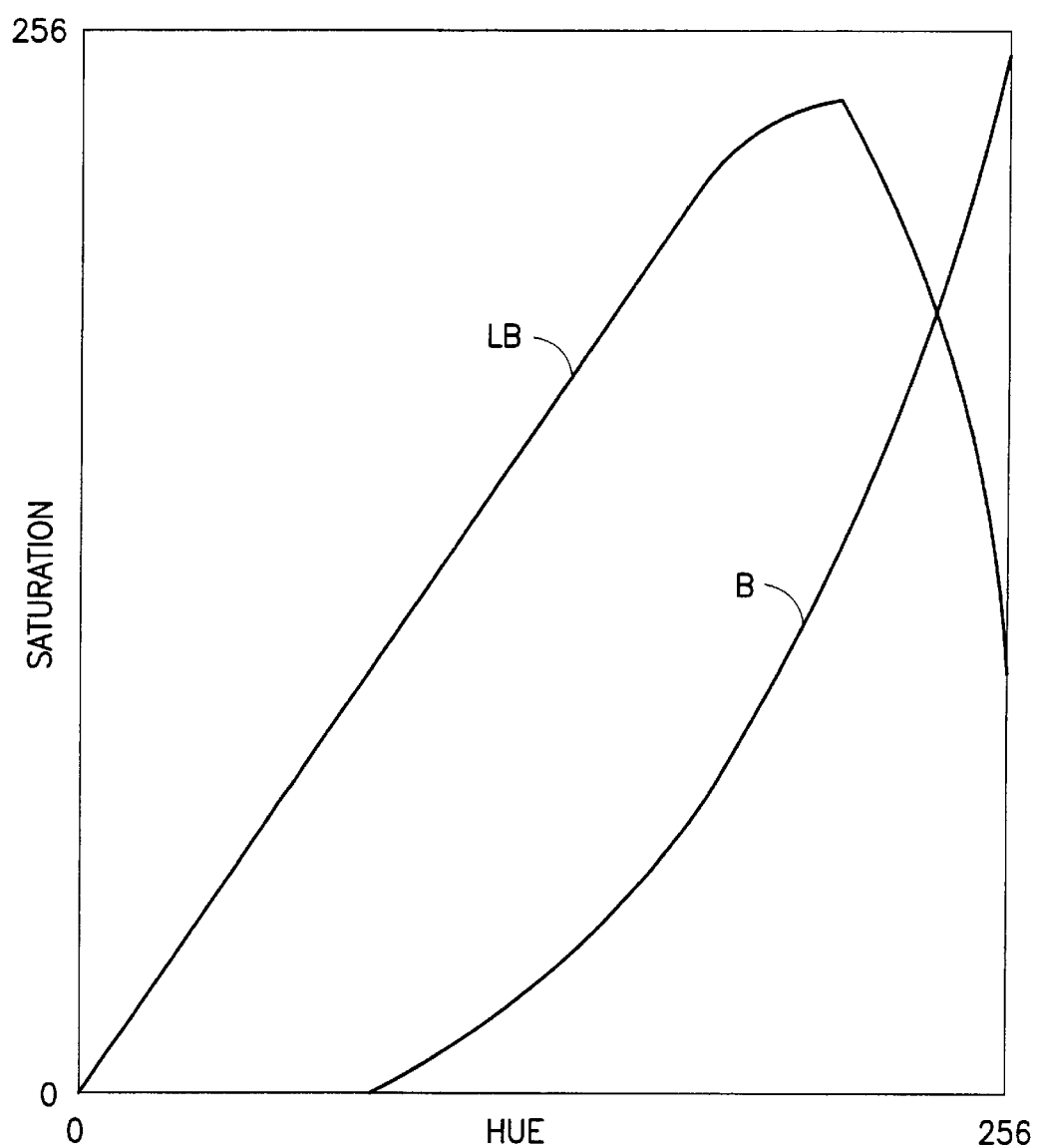
FIG. 2 is a graph of hue and saturation curves for pseudo-colors of the ink-set of FIG. 2, wherein B is blue and LB is light blue.

Blue/Light Blue Pseudo-Color Curves (FIG. 2)

| | Curve # | |
|---|---|---|
| | 1 | 2 |
| Slot Color | LB | B |
| Slot | 6 | 3 |
| Hue In | 0 | 77 |
| Hue Middle | 208 | 256 |
| Hue Out | 256 | 256 |
| Saturation In | 0 | 0 |
| Saturation Peak | 240 | 256 |
| Saturation Out | 56 | 256 |

TABLE 5

Figure 3:
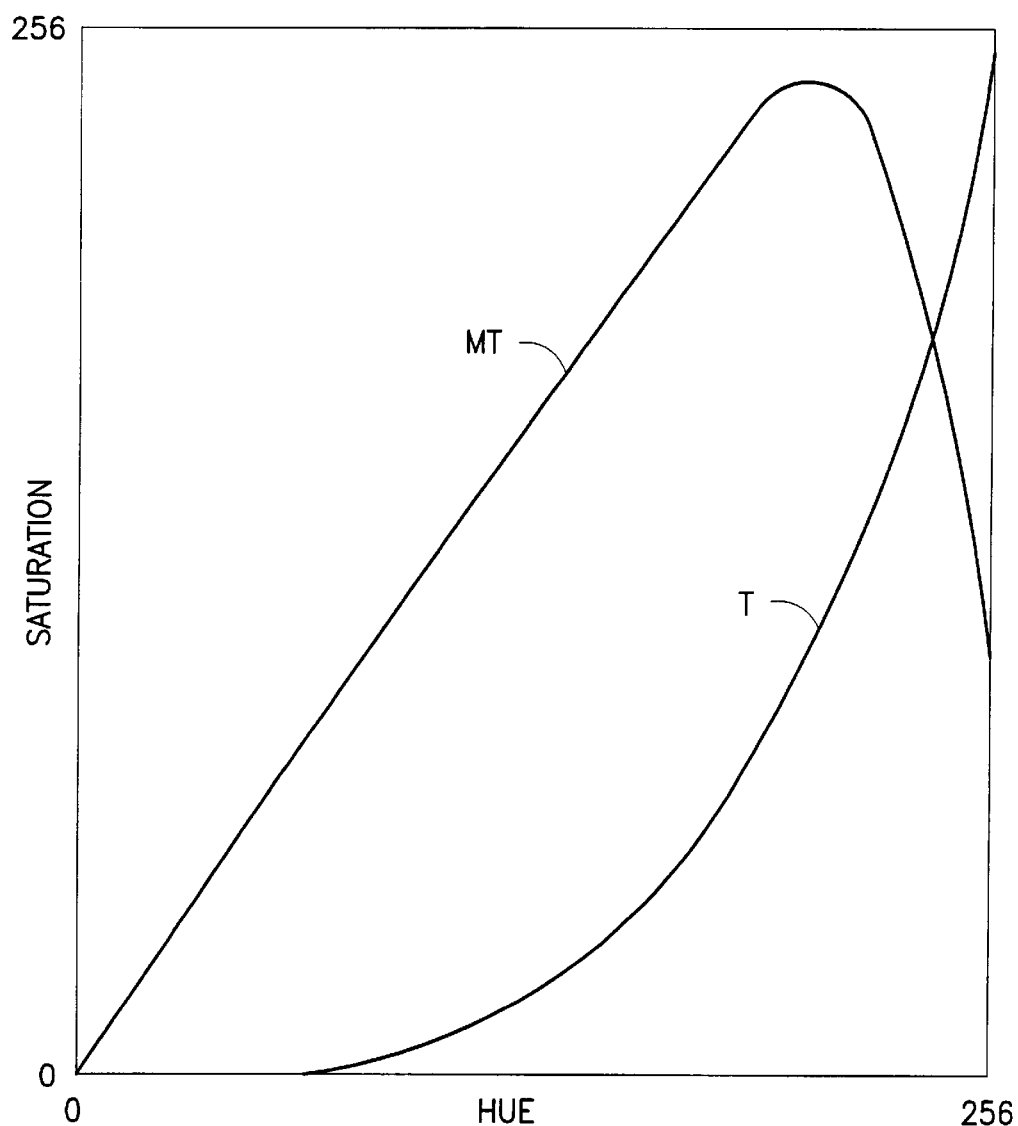
FIG. 3 is a graph of hue and saturation curves for pseudo-colors of the ink-set of FIG. 2, wherein T is turquoise and MT is medium turquoise.

Turquoise/Medium Turquoise Pseudo-Color Curves (FIG. 3)

| | Curve # | |
|---|---|---|
| | 1 | 2 |
| Slot Color | T | MT |
| Slot | 4 | 5 |
| Hue In | 42 | 0 |
| Hue Middle | 256 | 208 |
| Hue Out | 256 | 256 |
| Saturation In | 0 | 0 |
| Saturation Peak | 242 | 245 |
| Saturation Out | 256 | 96 |

TABLE 6

Figure 4:
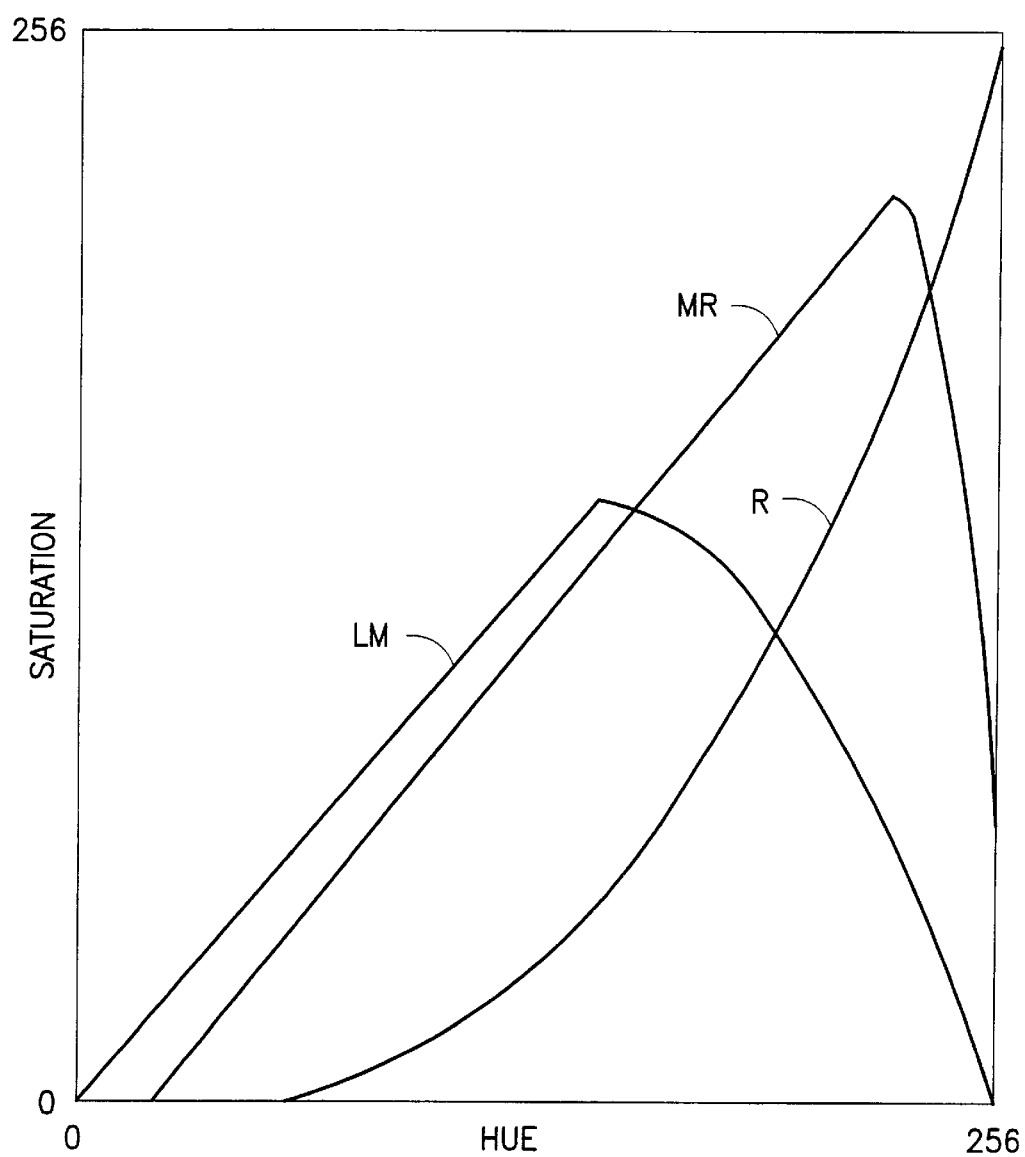
FIG. 4 is a graph of hue and saturation curves for pseudo-colors of the ink-set of FIG. 2, wherein R is red, and MR is medium red, and LM is light magenta.

Red/Medium Red/Light Magenta
Pseudo-Color Hue and Saturation Curves (FIG. 4)

|  | Curve # | | |
| --- | --- | --- | --- |
|  | 1 | 2 | 3 |
| Slot Color | R | MR | LM |
| Slot | 7 | 8 | 2 |
| Hue In | 50 | 21 | 0 |
| Hue Middle | 256 | 225 | 144 |
| Hue Out | 256 | 256 | 256 |
| Saturation In | 0 | 0 | 0 |
| Saturation Peak | 256 | 219 | 144 |
| Saturation Out | 256 | 64 | 0 |

TABLE 7

Figure 5:
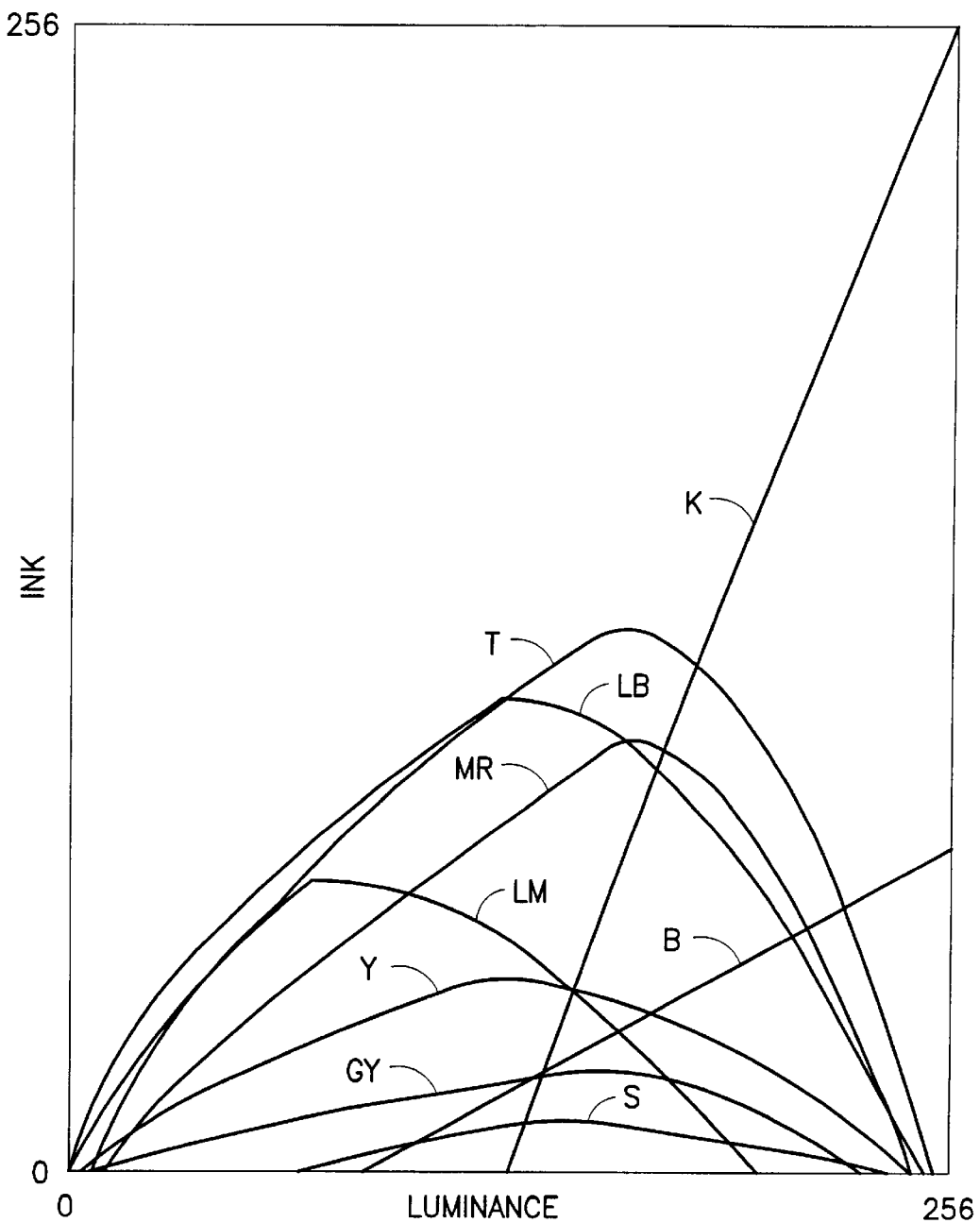
FIG. 5 is a graph of gray curves for 9 differently colored inks of the ink-set of FIG. 2, wherein K is black, MT is medium turquoise, GY is golden yellow, MR is medium red, LM is light magenta, S is scarlet, LB is light blue, Y is yellow, and B is blue.

Gray Scale Curves (FIG. 5)

|  | Curve # | | | | | | | | |
| --- | --- | --- | --- | --- | --- | --- | --- | --- | --- |
|  | 1 | 2 | 3 | 4 | 5 | 6 | 7 | 8 | 9 |
| Slot Color | K | MT | GY | MR | LM | S | LB | Y | B |
| Slot # | 1 | 5 | 11 | 8 | 2 | 9 | 6 | 12 | 3 |
| Luminance In | 128 | 0 | 0 | 8 | 0 | 56 | 5 | 0 | 82 |
| Luminance Middle | 256 | 160 | 157 | 162 | 69 | 128 | 128 | 120 | 256 |
| Luminance Out | 256 | 256 | 244 | 250 | 210 | 256 | 256 | 256 | 256 |
| Ink In | 0 | 0 | 0 | 1 | 0 | 0 | 0 | 0 | 0 |
| Ink Peak | 260 | 122 | 24 | 97 | 66 | 12 | 106 | 44 | 72 |
| Ink Out | 260 | 0 | 0 | 0 | 0 | 0 | 0 | 0 | 0 |

TABLE 8

Figure 6:
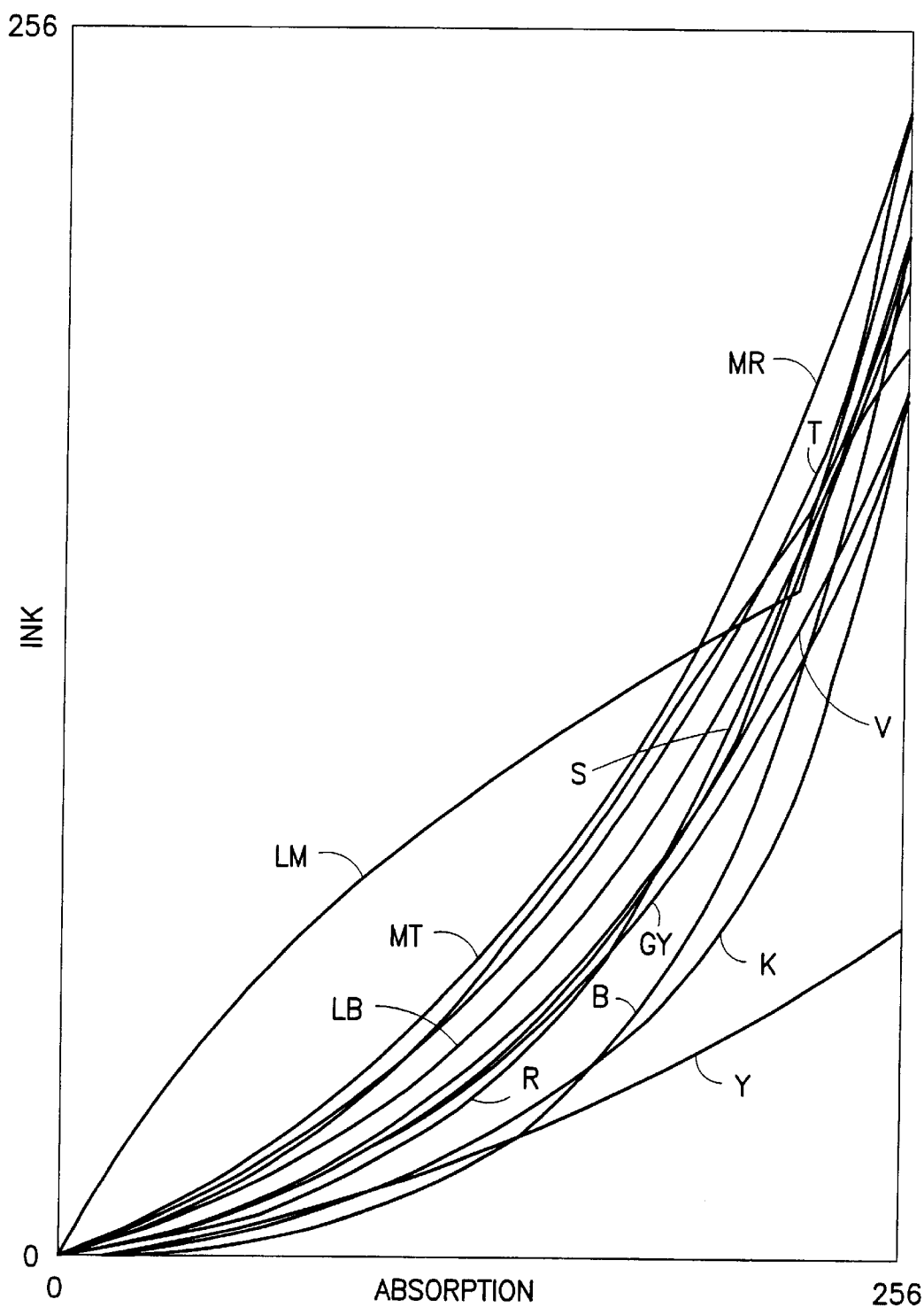
FIG. 6 is a profile of absorption curves for the 12 differently colored inks in the 12-ink ink-set of FIG. 2, wherein K is black, LM is light magenta, B is blue, T is turquoise, MT is medium turquoise, LB is light blue, R is red, MR is medium red, S is scarlet, V is violet, GY is golden yellow, and Y is yellow.

Absorption Profile Curves (FIG. 6)

|  | Curve # | | | | | | | | | | | |
| --- | --- | --- | --- | --- | --- | --- | --- | --- | --- | --- | --- | --- |
|  | 1 | 2 | 3 | 4 | 5 | 6 | 7 | 8 | 9 | 10 | 11 | 12 |
| Slot Color | K | LM | B | T | MT | LB | R | MR | S | V | GY | Y |
| Slot | 1 | 2 | 3 | 4 | 5 | 6 | 7 | 8 | 9 | 10 | 11 | 12 |
| Absorption In | 0 | 0 | 0 | 0 | 0 | 0 | 0 | 0 | 0 | 0 | 0 | 0 |
| Absorption Middle | 256 | 225 | 256 | 256 | 256 | 256 | 256 | 256 | 256 | 256 | 256 | 256 |
| Absorption Out | 255 | 256 | 255 | 255 | 255 | 255 | 255 | 255 | 255 | 255 | 255 | 255 |
| Ink In | 0 | 0 | 0 | 0 | 0 | 0 | 0 | 0 | 0 | 0 | 0 | 0 |
| Ink Peak | 183 | 139 | 214 | 211 | 189 | 205 | 228 | 242 | 242 | 178 | 172 | 68 |
| Ink Out | — | 208 | — | — | — | — | — | — | — | — | — | — |

The present invention having been described with reference to a preferred embodiment thereof, it will be obvious to those skilled in the art that various changes and modifications may be made without departing from the spirit and scope of the present invention.

What is claimed is:

1. An ink jet printed fabric comprising:
a fabric having at least about 30 to about 300 threads per inch, the fabric comprising an ink jet printed image, the ink jet printed image comprising a plurality of ink jet drop portions, wherein each ink jet drop portion is formed of 1 to 16 ink jet drops selected from 8 to 16 different colored inks, and wherein a first plurality of the ink jet drop portions comprise 8 to 16 drops selected from the 8 to 16 different colored inks.

2. A printed fabric of claim 1, wherein a second plurality of ink jet drop portions comprises 8 to 16 ink drops, wherein each portion of consists of one ink other than the color of the other second portions.

3. The printed fabric of claim 1, wherein the 8 to 16 different colored inks comprise: a scarlet ink, one or more medium red inks, and a violet ink.

4. The printed fabric of claim 1, wherein the 8 to 16 different colored inks does not include a green ink and an orange ink.

5. The printed fabric of claim 1, wherein the 8 to 16 different colored inks comprises at least one acid dye and one fiber-reactive dye.

6. The printed fabric of claim 5, the inks further comprising 2 or more acid dyes and 2 or more fiber-reactive dyes.

7. The printed fabric of claim 1, wherein a plurality of the portions comprise ink jet dots comprising scarlet, one or more medium reds, and a violet.

8. The printed fabric of claim 7, wherein the inks do not include gray, green, and orange.

9. The printed fabric of claim 7, wherein the inks comprise a light blue.

10. An ink jet printed substrate comprising:
a fabric having at least about 30 to about 300 threads per inch, the substrate comprising an ink jet printed image, the ink jet printed image comprising a plurality of ink jet drop portions, wherein each ink jet drop portion is formed of 1 to 16 ink jet drops selected from 8 to 16 different colored inks, and wherein a first plurality of the ink jet drop portions comprise 8 to 16 drops selected from the 8 to 16 different colored inks.

11. The printed substrate of claim 10, wherein the substrate comprises fibers.

12. The printed substrate of claim 11, wherein the 8 to 16 different colored inks comprises at least one acid dye and one fiber-reactive dye.

13. The printed substrate of claim 12, the inks further comprising 2 or more acid dyes and 2 or more fiber-reactive dyes.

14. The printed substrate of claim 12, wherein a plurality of the portions comprise ink jet dots comprising scarlet, one or more medium reds, and a violet.

15. The printed substrate of claim 14, wherein the inks do not include gray, green, and orange.

16. The printed substrate of claim 14, wherein the inks comprise a light blue.

17. A printed substrate of claim 10, wherein a second plurality of ink jet drop portions comprises 8 to 16 ink drops, wherein each portion of consists of one ink other than the color of the other second portions.

18. The printed substrate of claim 10, wherein the 8 to 16 different colored inks comprise: a scarlet ink, one or more medium red inks, and a violet ink.

19. The printed substrate of claim 10, wherein the 8 to 16 different colored inks does not include a green ink and an orange ink.

* * * * *